Patented Aug. 29, 1939

2,171,495

UNITED STATES PATENT OFFICE 2,171,495

ETHERS OF POLYHYDROXY HALOGENATED PHENOLS

Lucas P. Kyrides, Webster Groves, Mo., assignor, by mesne assignments, to Monsanto Chemical Company, a corporation of Delaware No Drawing. Original application March 21, 1932, Serial No. 600,380. Divided and this application November 30, 1938, Serial No. 243,163

8 Claims. (Cl. 260—613)

This invention relates to a novel class of phenol compositions characterized in that they contain at least one halogen atom, at least one free hydroxyl group, and an aliphatic radical joined to the benzene nucleus.

The object of the invention is to provide a novel class of halogenated phenolic compositions which possess inordinate bactericidal, germicidal, as well as general disinfecting properties.

Heretofore certain alkylyl (acyl) and alkyl resorcinols have been proposed as general disinfecting agents. The present invention contemplates phenolic compositions represented by the following formula:

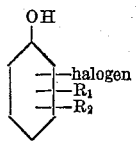

where in the case of alkyl and acyl derivatives $R_1$ is a hydroxy group and $R_2$ is an alkyl or acyl group having more than four and not more than twelve carbon atoms, or where in the case of the ether derivatives, $R_1$ is a hydrogen atom and $R_2$ is an alkoxy (ether) group having more than four and not more than twelve carbon atoms.

This application is a division of my co-pending application, Serial No. 600,380, filed March 21, 1932. The claims of this application are specifically directed to the ether compounds. Reference is also made to my copending application Serial No. 660,524, filed March 13, 1933, which has issued as Patent No. 2,093,778 and which is a continuation-in-part of my application Serial No. 600,380, both of which claim subject matter disclosed herein.

The inordinate efficacy of this class of compounds is exemplified by the fact that whereas hexyl resorcinol possesses a phenol co-efficient as measured by the Reddish method of 125, chlorhexyl-resorcinol tested under the same conditions and on the same strain of bacteria possesses a phenol co-efficient of 330.

In general, compositions contemplated by the present invention having a relatively large number of carbon atoms in the aliphatic chain are more effective against *Staphylococcus aureus*, whereas those having relatively fewer carbon atoms in the aliphatic chain are more effective against *Bacillus typhosus*. Under the circumstances, it is advantageous to employ mixtures of the material where general disinfection is sought.

Alkyl resorcinols are made conveniently by reacting an aliphatic acid with resorcinol in the presence of zinc chloride whereby the corresponding alkylyl resorcinol is formed which may be reduced by the Clemmensen method (using hydrochloric acid and amalgamated zinc) to form the alkyl resorcinol. Hexyl resorcinol is derived in this manner from caproic acid through hexylyl resorcinol as the intermediate ketone.

Products contemplated by the present invention may be prepared by proceeding in an analogous manner. The alkyl dihydroxy benzenes are then halogenated in any suitable manner, the chloride being formed, for example, by treatment with sulfuryl chloride. The products may also be prepared by first halogenating a dihydroxy benzene and thereafter reacting the resulting product with an aliphatic acid chloride to form the ester which rearranges in the presence of various reagents such as zinc chloride to form the ketone. In case the corresponding alkyl composition is desired, the ketone is reduced to the alkyl composition by the Clemmensen method. The ethers are prepared by reacting the sodium salt of the dihydroxy halogenated phenol with the desired aliphatic alkylating agent, such as hexyl chloride or bromide. The hexyl derivative may be represented by the following formula:

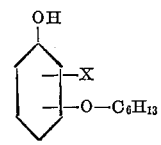

where X represents a halogen atom.

In general, these compositions may be employed in a manner analogous to that employed in connection with corresponding non-halogenated aliphatic derivatives of phenols in mouth-washes, toothpastes, fungus or mould preventive preparations as well as in general disinfectants for internal or external use. Various solvents, such as aqueous glycerol, glycol, ethyl alcohol, etc., may be employed either alone or in admixture with each other. Obviously, other ingredients may be added, depending upon the specific intended use to be made of the final product, including flavor, coloring matter, as well as other antiseptic compositions.

One example of the new class of disinfectants, namely, monochlor-hexyl resorcinol, which may be represented as:

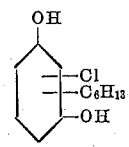

is prepared conveniently by the following method:

Resorcinol is dissolved in approximately four parts by weight of isopropyl ether, and the calculated amount of sulfuryl chloride necessary to form monochlor-resorcinol is added at 30°–35° C. while stirring the solution. The reaction is completed at approximately 60° C., after which the solvent is removed by distillation and the residual products distilled under reduced pressure. A weighed quantity of the monochlor-resorcinol thus prepared is melted and an approximately equimolecular portion of n-hexoyl chloride is added slowly while agitating the reaction mixture vigorously and maintaining the temperature at 100°–120° C. Anhydrous zinc chloride in an amount equal to approximately 10% of the weight of the chlor-resorcinol employed is added, the temperature being maintained at 100°–120° C. for aproximately three hours. The reaction mixture is washed with water and distilled in vacuum. The ketone, which may be represented as:

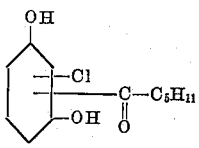

boils at 134° C. at approximately 5 mm. pressure. It is reduced to hexyl-chlor-resorcinol, if desired, by vigorously refluxing with dilute hydrochloric acid and amalgamated zinc for approximately 10 hours. The product is then washed with water and distilled, the boiling point being 153° C. at approximately 5 mm. pressure. The product melts at aproximately 40° C.

If desired, the hexyl-monochlor-resorcinol may be prepared by chlorinating hexyl-resorcinol with sulfuryl chloride, distilling the product and subsequently crystallizing the same preferably from petroleum ether in the presence of water.

Another example of the new class of disinfectants, namely, the hexyl-monochlor-catechol, which may be represented as:

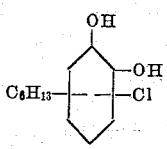

is prepared by chlorinating n-hexyl-catechol by any suitable method as for example, by treatment with sulfuryl chloride or a solution of chlorine in carbon tetrachloride or acetic acid.

As a further example of the new disinfectants, a monochlor-octyl-resorcinol, which may be represented as:

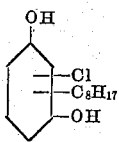

is prepared by condensing an octoic acid, such as that possessing the structure:

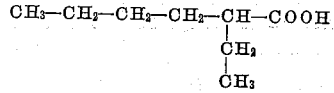

with resorcinol in the presence of zinc chloride, reducing the ketone thus formed by the Clemmensen method, and chlorinating the product by treatment with a suitable chlorinating agent, such as sulfuryl chloride.

A hydrated form having a melting point of 56° C. is obtained by crystallizing the product from petroleum ether containing a small amount of water. Its phenol coefficient is over 1,300.

n-Heptyl-monochlor ocatechol may be prepared by causing a solution of chlorine in acetic acid to react with an acetic acid solution of n-heptyl catechol. When the reacted mixture is poured into water, the product separates as an oil and may be purified by distilling in vacuum.

As an example of a brominated alkyl dihydroxy benzene, n-hexyl-monobrom-resorcinol may be prepared by adding bromine, diluted with acetic acid, to a solution of n-hexyl resorcinol in acetic acid. Upon dilution with water, the product separates as an oil.

By methods analogous to those described above, other derivatives may be prepared, such for example, as n-hexoyl-chlor-resorcinol, n-octoyl-chlor resorcinol, n-heptoyl-chlor-catechol, n-hexoyl-brom-resorcinol, alpha ethyl-hexoyl-brom-hydro-quinone, their corresponding alkyl derivatives, et al. Obviously, by substituting the appropriate alkyl bromide, or chloride, a corresponding ether is obtained from the alkali metal salt of the phenol.

These products possess high phenol coefficients and are suitable for the purposes herein set forth. It will be apparent from the foregoing description that the present invention affords a novel class of compositions which possess strong germicidal properties and which may be employed in very small amounts without defeating the purposes for which they are intended. While representative examples of the application of the principles of the invention have been set forth, these are illustrative only, since the invention is susceptible to many variations without departing from the scope thereof as defined in the appended claims.

When the resorcinol is halogenated as with sulfuryl chloride the halogen enters the 4 position in the resorcinol nucleus.

What I claim is:

1. Ethers of 4-chloro resorcinol having the general formula $C_6H_3$ (OH) (OR) Cl where R is an alkyl group having more than three carbon atoms.

2. Ethers of 4-chloro resorcinol having the general formula $C_6H_3$ (OH) (OR) Cl where R is an alkyl group normal in configuration and containing more than three carbon atoms.

3. Ethers of 4-chloro resorcinol having the general formula $C_6H_3$ (OH) (OR) Cl where R is an alkyl group secondary in configuration and containing more than three carbon atoms.

4. Ethers of 4-chloro resorcinol having the general formula $C_6H_3$ (OH) (OR) Cl where R is an alkyl group branched in configuration and containing more than three carbon atoms.

5. A new product, mono-n-hexyl ether of 4-chloro resorcinol having the formula $C_6H_3$ (OH) ($OC_6H_{13}$) Cl.

6. A new product, mono-n-hexyl ether of 4-chloro resorcinol, being an oil boiling at substantially 152–162° C. at 2 mm.

7. Mono alkyl ethers of halogenated resorcinols in which the alkyl group contains more than 3 carbon atoms.

8. Mono alkyl ethers of a halogenated dihydroxy benzene in which the alkyl group contains more than 3 carbon atoms.

LUCAS P. KYRIDES.